United States Patent
Wu et al.

(10) Patent No.: US 7,054,398 B1
(45) Date of Patent: May 30, 2006

(54) METHOD FOR SELECTING SYNC MARKS AND SYNC MARK DETECTORS

(75) Inventors: Zining Wu, Los Altos, CA (US); Toai Doan, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 821 days.

(21) Appl. No.: 10/086,084

(22) Filed: Feb. 26, 2002

Related U.S. Application Data

(60) Provisional application No. 60/306,324, filed on Jul. 18, 2001, provisional application No. 60/327,805, filed on Oct. 9, 2001.

(51) Int. Cl.
*H04L 7/00* (2006.01)

(52) U.S. Cl. .................. 375/354; 375/342; 375/355; 375/366; 375/368

(58) Field of Classification Search ............... 375/342, 375/354, 355, 364, 365, 366, 368
See application file for complete search history.

(56) References Cited

U.S. PATENT DOCUMENTS

| | | | |
|---|---|---|---|
| 5,448,571 A | 9/1995 | Hong et al. | |
| 5,557,594 A * | 9/1996 | Chiba et al. | 369/59.24 |
| 5,793,548 A | 8/1998 | Zook | |
| 5,844,920 A | 12/1998 | Zook et al. | |
| 5,999,110 A * | 12/1999 | Blaum et al. | 341/59 |
| 6,023,386 A | 2/2000 | Reed et al. | |
| 6,104,560 A * | 8/2000 | Tsunoda | 360/51 |
| 6,173,430 B1 | 1/2001 | Massoudi | |
| 6,249,896 B1 | 6/2001 | Ho et al. | |
| 6,438,187 B1 * | 8/2002 | Abbey | 375/368 |
| 6,519,104 B1 * | 2/2003 | Cloke et al. | 360/51 |
| 2002/0048330 A1 * | 4/2002 | Schetelig et al. | 375/340 |
| 2002/0063984 A1 * | 5/2002 | McClellan et al. | 360/46 |
| 2002/0094048 A1 * | 7/2002 | Simmons et al. | 375/362 |

FOREIGN PATENT DOCUMENTS

EP  1 089 486 A2  4/2001

\* cited by examiner

*Primary Examiner*—Kevin Burd
*Assistant Examiner*—Freshteh Aghdam

(57) ABSTRACT

A sync mark detector identifies a sync mark in an incoming bitstream of a communications channel. A bit comparing circuit compares the sync mark bit-by-bit to the incoming bitstream if channel irregularities do not exist. A symbol comparing circuit compares the sync mark symbol-by-symbol to the incoming bitstream if channel irregularities do exist. The bit comparing circuit implements a bit level matching rule. The symbol comparing circuit implements a symbol level matching rule. The bit comparing circuit generates a sync mark found state when the bit level matching rule is satisfied. The symbol comparing circuit generates a sync mark found state when the symbol level matching rule is satisfied. Post coding such as NRZ, INRZI, or NRZI can be used.

86 Claims, 7 Drawing Sheets

Input       1100110011000000011
Error-event 0000-0000000000000
Output      1100010011000000011

|                  | Sync field | Sync-mark |
|------------------|------------|-----------|
| Input bit stream | ...1 1 0 0 1 1 0 0 | 1 1 0 0 0 0 0 0 1 1... |
| Search phase     | ...4 3 2 1 4 3 2 1 | 4 3 2 1 4 3 2 1 4 3... |

| NRZ Domain | INRZI Domain |
|------------|--------------|
| +-+        | xx0xx        |
| +          | x0x          |
| +-         | xxxx         |
| +00+       | x0xx0x       |
| +000+      | x0x0x0x      |
| +0+        | x000x        |

Most Likely Error-Events

Bit error rate at the input to the sync-mark detector

METHOD FOR SELECTING SYNC MARKS AND SYNC MARK DETECTORS

CROSS-REFERENCE TO RELATED APPLICATIONS

This application claims the benefit of U.S. Provisional Application No. 60/306,324, filed Jul. 18, 2001 and U.S. Provisional Application No. 60/327,805, filed Oct. 9, 2001, which are both hereby incorporated by reference.

FIELD OF THE INVENTION

The present invention relates to synchronization marks, and more particularly to the selection and detection of sync marks in a communications channel.

BACKGROUND OF THE INVENTION

Referring now to FIGS. 1 and 2, an incoming bitstream 10 includes synchronization (sync) marks 12 that are positioned after a sync field 14 to identify a starting bit of user data 16. Typically, the sync field 14 includes a repeating pattern such as "1100". A conventional sync mark detector 30 is connected to a front end 32 of a communications channel such as a wireless link, a disk drive or any other communications channel. The front end 32 provides the incoming bitstream 10 to a bit decision circuit 33 such as a Viterbi circuit. An output of the bit decision circuit 33 is coupled to a buffer 34 such as a first in first out (FIFO) buffer. A comparison circuit 36 of the sync mark detector 30 declares synchronization (or a sync mark found state) if bits stored in the buffer 34 match a predefined sync mark 38 according to a predetermined rule 40. For example for a 3 byte sync mark, the sync mark found state can be declared if 1 of 3 bytes are detected. For a 4 byte sync mark, the sync mark found state can be declared if 2 out of 4 bytes are detected.

Referring now to FIG. 1, three different types of sync mark errors may occur during the synchronization process. A sync mark miss is declared if the sync mark detector 30 does not find the predefined sync mark 38 in the incoming bitstream 10. In this case, a retry is required. Misalignment errors occur if the sync mark detector 30 declares the sync mark found state at a wrong position in the incoming bitstream 10. In particular, early alignment 42 refers to the declaration of the sync mark found state before the correct position in the incoming bitstream 10. Late alignment 46 refers to the declaration of the sync mark found state after the correct sync mark position in the incoming bitstream 10. For example when early or late alignment 42 or 46 occur in a disk drive, the bit decision circuit 33 continues operating for the remainder of a current sector and causes an error correction coding (ECC) failure. In this situation, a retry request is generated at the end of the sector.

Late alignment 46 occurs when a sync mark miss happens. Bits of the user data 16 after the sync mark 12 match the last several bits of the sync mark 38 so that a sync mark found is declared after the correct position in the incoming bitstream 10. In this situation, the probability of the late alignment 46 is less than the probability of the sync mark miss. Early alignment 42 happens when the end of the sync field 14 combined with the beginning of the sync mark 12 is similar to the sync mark 38.

Referring now to FIG. 3, an example of early alignment is shown. The sync mark includes two 5 bit symbols (11000 and 00011) and a 1-out-of-2 symbol matching rule is used. A single error event, identified by "−" causes the first 5 bits to be the same as the first sync mark symbol and leads to early alignment 42.

SUMMARY OF THE INVENTION

A sync mark detector according to the present invention identifies a sync mark in an incoming bitstream of a communications channel. A bit comparing circuit compares the sync mark bit-by-bit to the incoming bitstream if channel irregularities do not exist. A symbol comparing circuit compares the sync mark symbol-by-symbol to the incoming bitstream if channel irregularities do exist.

In other features, the channel irregularities cause long consecutive bit errors. A bit decision circuit decodes the incoming bitstream. A first buffer communicates with the bit decision circuit and stores M bits of the incoming bitstream at a desired phase. Alternately, a first post coding circuit communicates with the bit decision circuit. A first buffer communicates with the first post coding circuit and stores M bits of the incoming bitstream at a desired phase. The first post coding circuit performs INRZI or NRZI post coding.

In still other features, a second buffer communicates with the bit decision circuit and stores M bits of the incoming bitstream at a desired phase. Alternately, a second post coding circuit communicates with the bit decision circuit. A second buffer communicates with the second post coding circuit and stores M bits of the incoming bitstream at a desired phase. The second post coding circuit performs INRZI or NRZI post coding.

In yet other features, the bit comparing circuit implements a bit level matching rule and the symbol comparing circuit implements a symbol level matching rule. The bit comparing circuit generates a sync mark found state when the bit level matching rule is satisfied. The symbol comparing circuit generates a sync mark found state when the symbol level matching rule is satisfied.

In yet other features, a longest error event in the sync mark causes x bit errors. A symbol length of the symbols in the incoming bitstream are limited to (x−1). The sync mark includes (4+3s) symbols and the symbol comparing circuit implements a (2+s)-out-of-(4+3s) matching rule for identifying sync marks.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
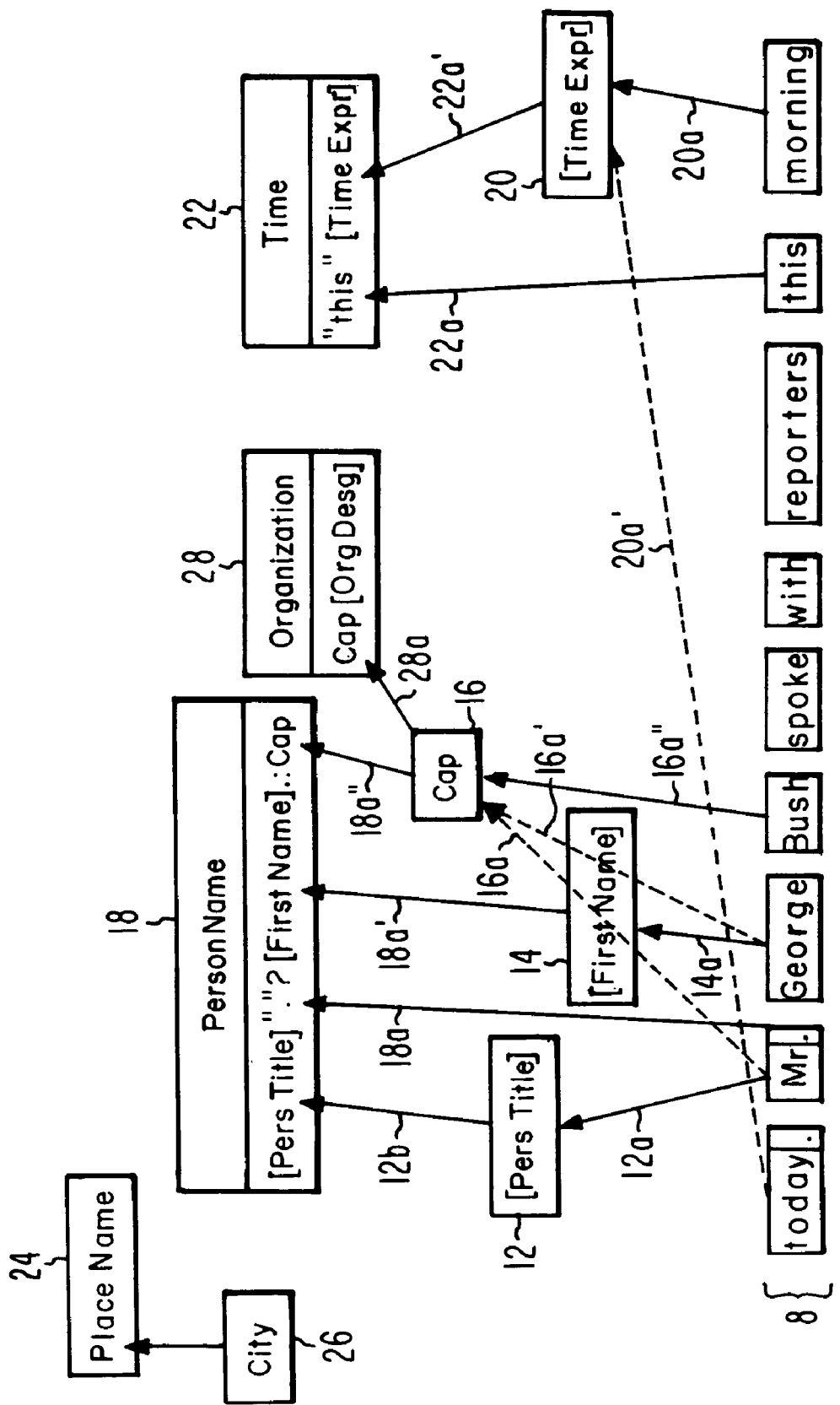
FIG. 1 illustrates an incoming bitstream of a communications channel.
Figure 2:
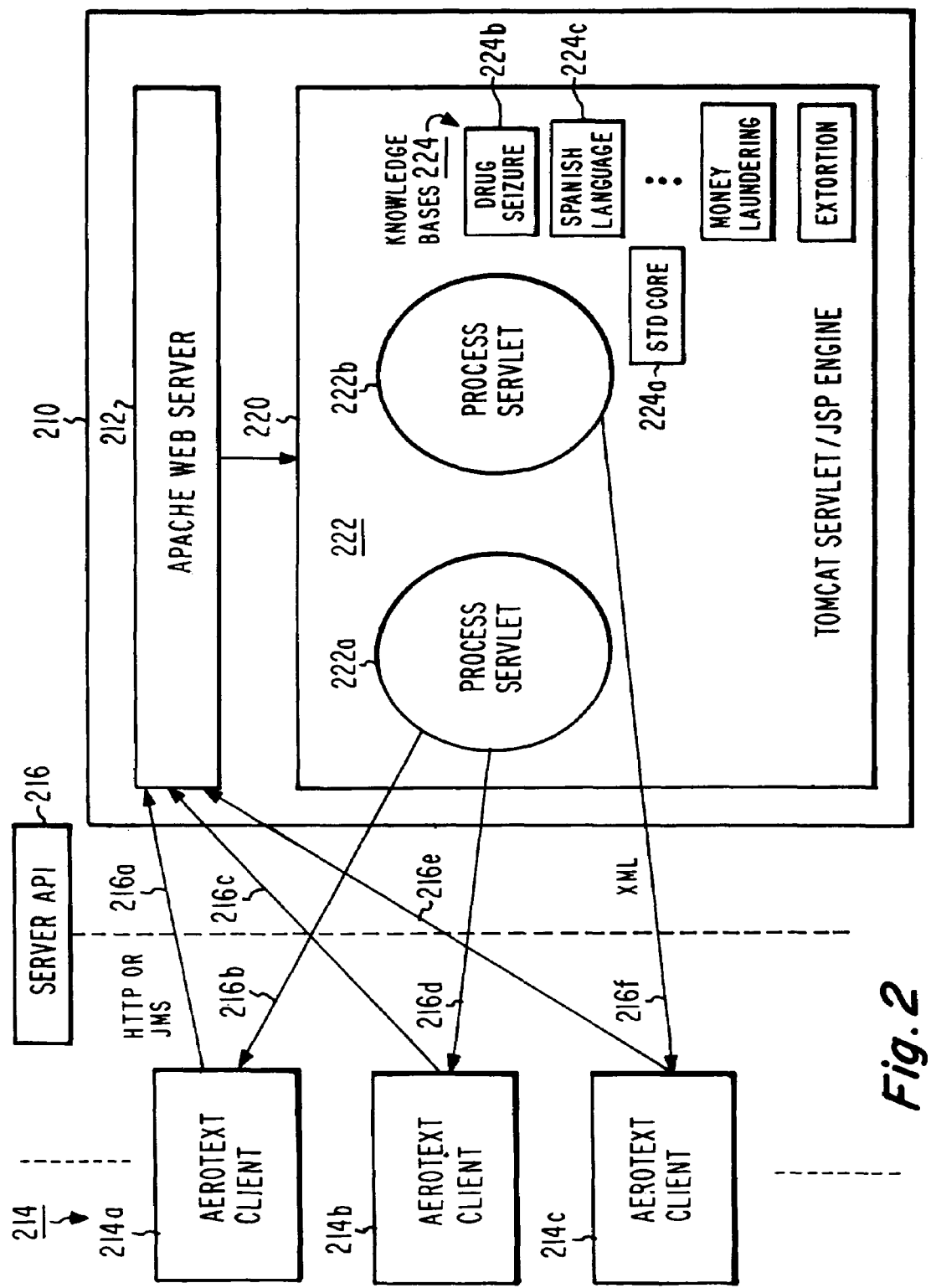
FIG. 2 is a functional block diagram of a sync mark detector according to the prior art.

The following description of the preferred embodiment(s) is merely exemplary in nature and is in no way intended to limit the invention, its application, or uses.

To reduce the early alignment probability, an M-bit sync mark should be different than the M previous bits. The M previous bits contain the last K bits of the sync field 14 plus the first M–K bits of the sync mark 12 (where K>1). A minimum Hamming distance $d_H$ of a sync mark is defined as a minimum bit difference between the sync mark and any previous M bits of the incoming bitstream. According to the present invention, the sync mark is divided into several symbols where each symbol contains several consecutive bits. The minimum symbol distance of a sync mark is defined as the minimum symbol difference between the sync mark and any previous M bits.

In a non return to zero (NRZ) domain, the polarity of a read back signal may be inverted by the front end 32. The sync mark detector 30 compares the incoming bitstream 10 with the sync mark and a bit complement of the sync mark. Therefore, the minimum Hamming distance $d_H$ in the NRZ domain is the minimum bit difference between the sync mark and any M previous bits or their bit complements. The minimum symbol distance in the NRZ domain is defined similarly. When sync mark detection is performed in the NRZI or INRZI domain, the polarity issue does not exist. Therefore the minimum Hamming distance $d_H$ (minimum symbol distance) is the bit (symbol) difference between the sync mark and any M previous bits.

Figures 3, 4, 5:
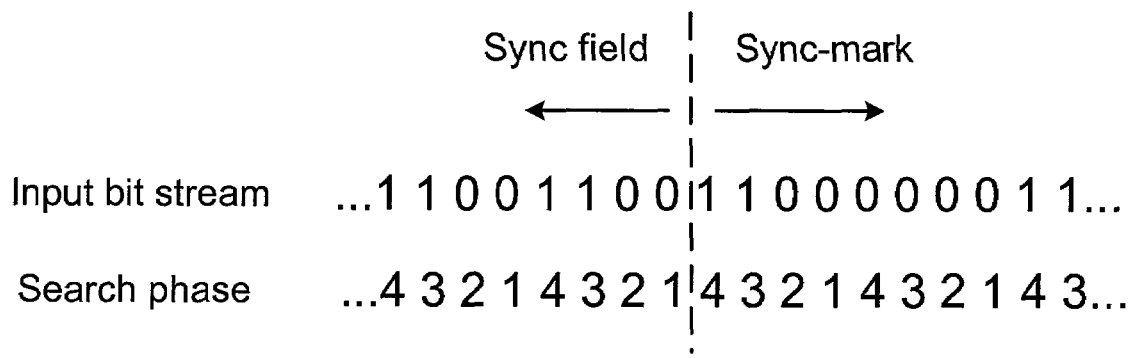
FIG. 3 illustrates an exemplary input bitstream with error events and an example of early alignment.
FIG. 4 illustrates all-phase and limited-phase detection of the incoming bitstream.
FIG. 5 is a table illustrating most likely error events for NRZ and INRZI domains.

Referring now to FIG. 4, when the sync mark detector 30 searches for the sync mark 12, the sync mark detector 30 can start searching at any bit position. Alternately, the sync mark detector 30 can start searching only at certain bit positions. For example, the sync mark detector 30 may start searching at periodic bit positions. Because the sync field 14 has a repeating pattern, such as "1100", the search may be divided into four phases. If the search for a sync mark starts at any phase, it is called an all-phase detection. If the search starts only at selected phases, for example phase 4 and/or phase 2, it is called a limited-phase detection. The limited-phase detection typically produces larger $d_H$ as compared with all-phase detection.

Two types of errors may occur in the read back signal of a communications channel such as a disk drive. Short error events are caused by noise. As used herein, channel irregularities refers to long consecutive bit errors in the incoming bitstream. Examples of channel irregularities include thermal asperity and/or media defects. Still other channel irregularities that cause long consecutive bit errors are contemplated. Short error events usually corrupt several consecutive bits and can cause both sync mark miss and misalignment.

Common error events are set forth in FIG. 5. "x" identifies the error that it can be either "+" or "−" depending upon the preceding bits. Since each of these error events only corrupts a small number of bits, a sync mark with a larger Hamming distance $d_H$ can tolerate an increased number of short error events when bit-by-bit matching is performed. Because errors propagate after the $(1 \oplus D^2)$ post coding, bit-by-bit detection is preferably performed in the NRZ domain. Channel irregularities corrupt long consecutive bits of the sync mark. Therefore, symbol-by-symbol matching is more robust when channel irregularities occur.

The largest minimum Hamming distance $d_H$ of any 36 bit sync mark cannot exceed 36. Therefore, 18 consecutive bit errors would fail the sync mark. However, a carefully designed 36 bit sync mark can tolerate up to 20 consecutive bit errors when symbol-by-symbol detection is used as will be described more fully below.

Figure 6A:
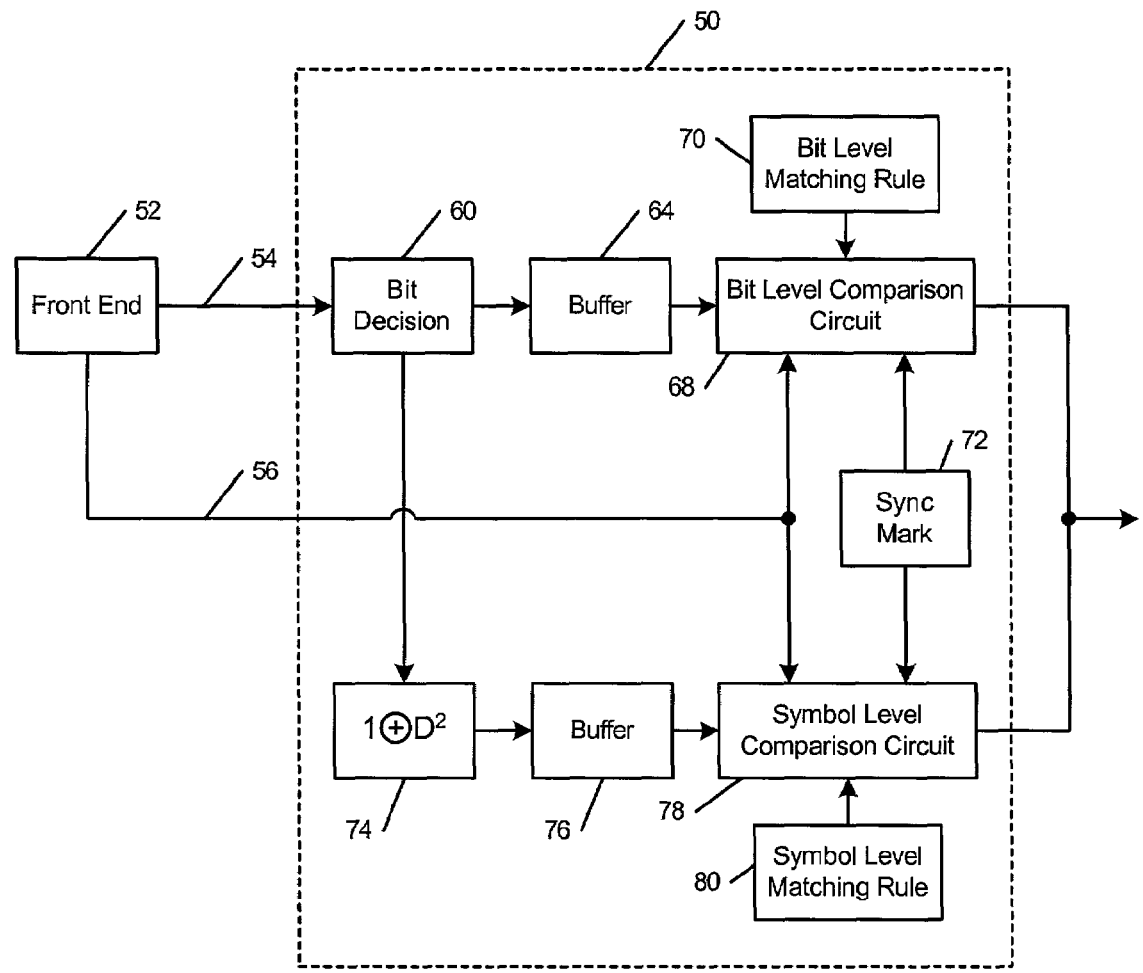
FIG. 6A is a functional block diagram of a first exemplary sync mark detector according to the present invention.

Referring now to FIG. 6A, a sync mark detector 50 according to the present invention is shown. The sync mark detector 50 includes a front end 52 that provides an incoming bitstream 54 and a channel irregularity signal 56 that identifies the presence of channel irregularities. The sync mark detector 50 includes first and second operating modes. When the first operating mode is enabled by the channel irregularity signal (when channel irregularities are not present), a bit decision circuit 60 receives the incoming bitstream and generates an output to a first buffer 64. The buffer 64 is connected to a bit level comparison circuit 68 that applies a bit level matching rule 70 when comparing a sync mark 72 to the incoming bitstream.

In the second operating mode (when channel irregularities are present), the bit decision circuit 60 is connected to an INRZI $(1 \oplus D^2)$ post coding circuit 74. The INRZI post coding circuit 74 is connected to a buffer 76. The buffer 76 is connected to a symbol level comparison circuit 78 that applies a symbol level matching rule 80 when comparing the sync mark 72 (or symbols thereof) to the coded incoming bitstream.

Figure 6B:
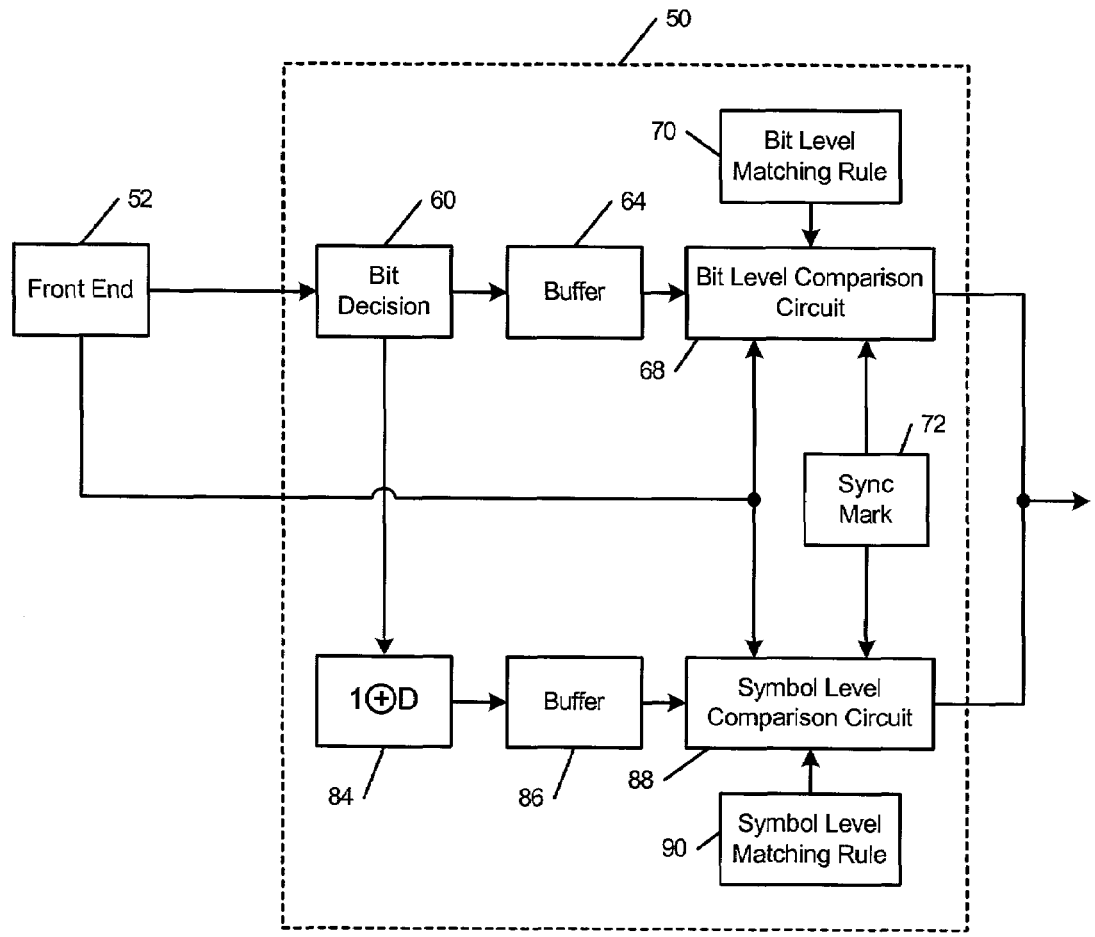
FIG. 6B is a functional block diagram of a second exemplary sync mark detector according to the present invention.

For purposes of clarity, reference numbers from FIG. 6A are used in FIG. 6B to identify similar elements. In the second operating mode (when channel irregularities are present), the bit decision circuit 60 is connected to a NRZI post coding circuit 84 $(1 \oplus D)$. The NRZI post coding circuit 84 is connected to a buffer 86. An output of the buffer 86 is input to a symbol level comparison circuit 88 that applies a symbol level matching rule 90 when comparing the sync mark 72 to the incoming bitstream. As can be appreciated, the first operating mode may alternately employ NRZI or INRZI post coding. Likewise, the second operating mode may alternately employ NRZ post coding.

The sync mark detector 50 tolerates both short and long error events. If channel irregularities-exist, symbol-by-symbol detection is provided by the second operating mode. Otherwise, bit-by-bit detection is provided by the first operating mode. Sync marks are specifically designed for the sync mark detector 50 using the following criteria. Preferably "101" or "010" patterns are not allowed. These patterns make a "+−+" error event possible. This error pattern is a dominant error event that corrupts three bits when detected in the NRZ domain. Other common error events only corrupt 2 bits.

In symbol-by-symbol detection, error events may occur across the symbol boundaries. Therefore, a single error event can corrupt more than one symbol. All of the dominant error events are less than six bits long after (1⊕D²) INRZI post coding except for the pattern "+000+" that propagates to seven bits. Therefore, if each symbol contains five bits and the patterns "10001" and "01110" are forbidden to start immediately before a symbol boundary, the error events listed in FIG. 5 can only corrupt a maximum of 2 symbols. This requirement can be altered to provide various different error propagation protections. For example, if the sync mark detector 50 performs symbol-by-symbol detection in the NRZ domain, it is possible to define symbols of more than five bits and to forbid an error event to cross the symbol boundaries. In this case, an error event can only corrupt one symbol.

Figure 7:
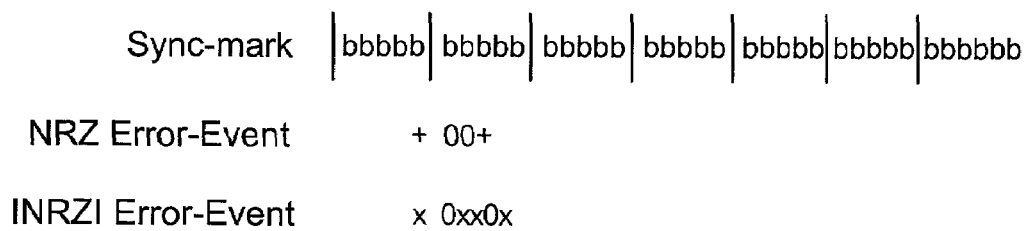
FIG. 7 illustrates a sync mark divided into multi-bit symbols and error events that cross symbol boundaries of the sync mark.

For example, an exemplary 36 bit sync mark can be divided into 7 symbols with 5 bits in the first 6 symbols and 6 bits in the last symbol as shown in FIG. 7. The last symbol can be 4 bits, 5 bits or 6 bits without significantly affecting the performance of the sync mark detector. If the error event starts in the last two symbols, it can corrupt at most 2 sync mark symbols.

If the sync mark contains m symbols, the sync mark found state is declared if at least n symbols are matched. Because the error event can potentially corrupt 2 symbols, the sync mark can tolerate [(m−n)/2] error events where [(m−n)/2] is the largest integer not exceeding (m−n)/2. Therefore, (m−n) is preferably an even number.

In both bit-by-bit and symbol-by-symbol detection modes, the early alignment probability is preferably not greater than the probability of a sync mark miss. This requires a large minimum Hamming distance $d_H$ for bit-by-bit detection and a large minimum symbol distance in the symbol-by-symbol detection. A good sync mark also needs to produce a high number of polarity transitions when it is written onto a recording media or transmitted through a communications channel to ensure that the timing recovery loop contains enough information to recover the symbol clock.

Based upon the foregoing, exemplary 64 bit, 36 bit and 34 bit sync marks were generated and are listed in Tables of the above-identified Provisional Applications. The ending sync field pattern of "1100" is taken into consideration when counting the number of transitions. As can be appreciated, other sync marks may be generated.

The exemplary 64 bit sync mark contains 13 symbols. Each of the first 12 symbols contains 5 bits. The last symbol contains 4 bits. During symbol-by-symbol detection, the sync mark found state is declared if 5 out of 13 symbols match the predefined sync mark in the INRZI domain. Therefore, this sync mark can tolerate 4 error events during the symbol-by-symbol detection. During bit-by-bit detection, if the detector starts a sync mark search at even phases (for example, phases 2 and 4 in FIG. 4), the minimum Hamming distance $d_H$ of the sync mark increases to 25. This sync mark can tolerate 6 error events in NRZ detection, which is particularly suited for applications without channel irregularities.

The exemplary 36 bit sync mark contains 7 symbols. Each of the first 6 symbols contains 5 bits. The last symbol contains 6 bits. A 3 out of 7 matching rule results in a 2 error event tolerance in the symbol-by-symbol detection. During bit-by-bit detection, if the detector starts the sync mark search at even phases, a minimum Hamming distance $d_H$ of the sync mark increases to 14. This sync mark can tolerate 3 error events during NRZ detection, which is suitable for applications without channel irregularities.

The exemplary 34 bit sync mark also includes 7 symbols. Each of the first 6 symbols contains 5 bits. The last symbol contains 4 bits. A highly preferred pattern is "11100 00111 10001 11001 10000 11111 1110". The symbol-by-symbol detection uses a 3 out of 7 matching rule and tolerates 2 error events. The bit-by-bit detection starts searching at even phases and tolerates 3 error events with a minimum Hamming distance of 13.

Figure 8:
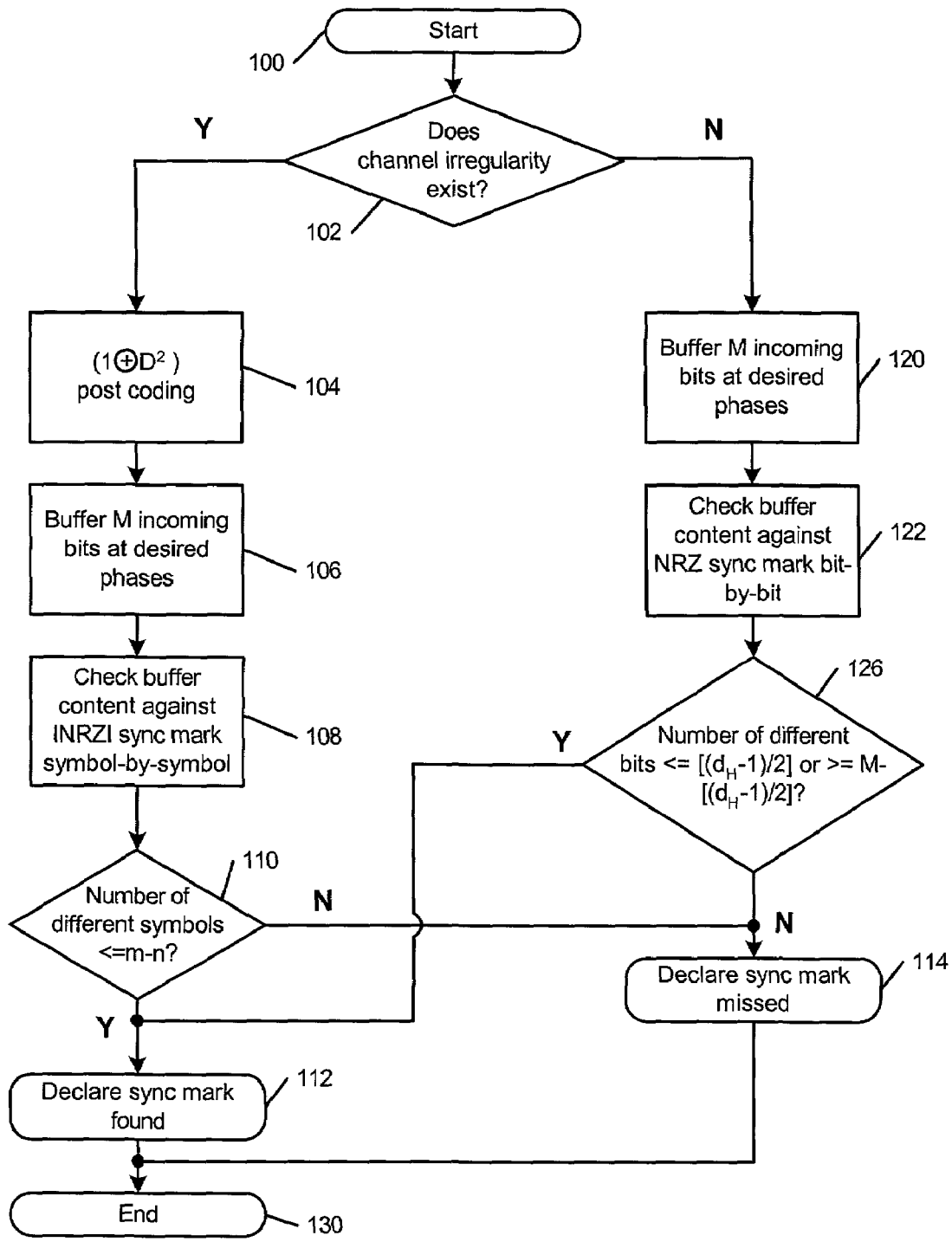
FIG. 8 illustrates steps performed by the first exemplary sync mark detector of FIG. 6A according to the present invention.

Referring now to FIG. 8, the method for operating the detector 50 is shown. In FIG. 8, it is assumed that the M-bit sync mark contains m symbols with a minimum Hamming distance $d_H$. The symbol-by-symbol detection requires n symbols to match. Symbol-by-symbol detection is performed in the INRZI domain with an all-phase search. Bit-by-bit detection is performed in the NRZ domain with a limited-phase search.

Bit-by-bit detection in the NRZ domain requires the incoming bitstream to be compared with both the sync mark and its bit complement. If the bit differences in either case are less than half of the Hamming distance $d_H$, the detector declares a sync mark found state. A more simple method is illustrated in FIG. 8. There, the detector 50 compares the incoming bitstream with the sync mark. If the bit differences are less than half of the Hamming distance $d_H$, or greater than or equal to M−[($d_H$−1)/2], the sync mark found state is declared. In the latter case, the incoming bits are within half of the Hamming distance $d_H$ from the inverted sync mark.

In the sync mark detection method of FIG. 8, control begins with step 100. In step 102, the sync mark detector 50 determines whether channel irregularities exist. If channel irregularities exist, control continues with step 104 where INRZI post coding is performed. In step 106, M bits of the incoming bitstream are buffered at desired phases. In step 108, the buffer is compared symbol-by-symbol with the INRZI sync mark. In step 110, if the number of different symbols is less than (m−n), a sync mark found state is generated in step 112. Otherwise, a sync mark missed state is generated at 114.

If channel irregularities do not exist in step 102, control continues with step 120 where M bits of the incoming bitstream are buffered at desired phases. In step 122, the buffer is compared bit-by-bit with the NRZ sync mark. In step 126, control determines whether the number of different bits is less than or equal to [($d_H$−1)/2] or if the number of different bits is greater than or equal to M−[($d_H$−1)/2]. If either condition is true, control continues from step 126 to step 112. Otherwise, control continues from step 126 to step 114. Control ends in step 130. As can be appreciated, the steps set forth in FIG. 8 can be readily modified by skilled artisans to perform NRZI post processing or any combination of NRZ, INRZI, or NRZI post processing.

Figure 9:
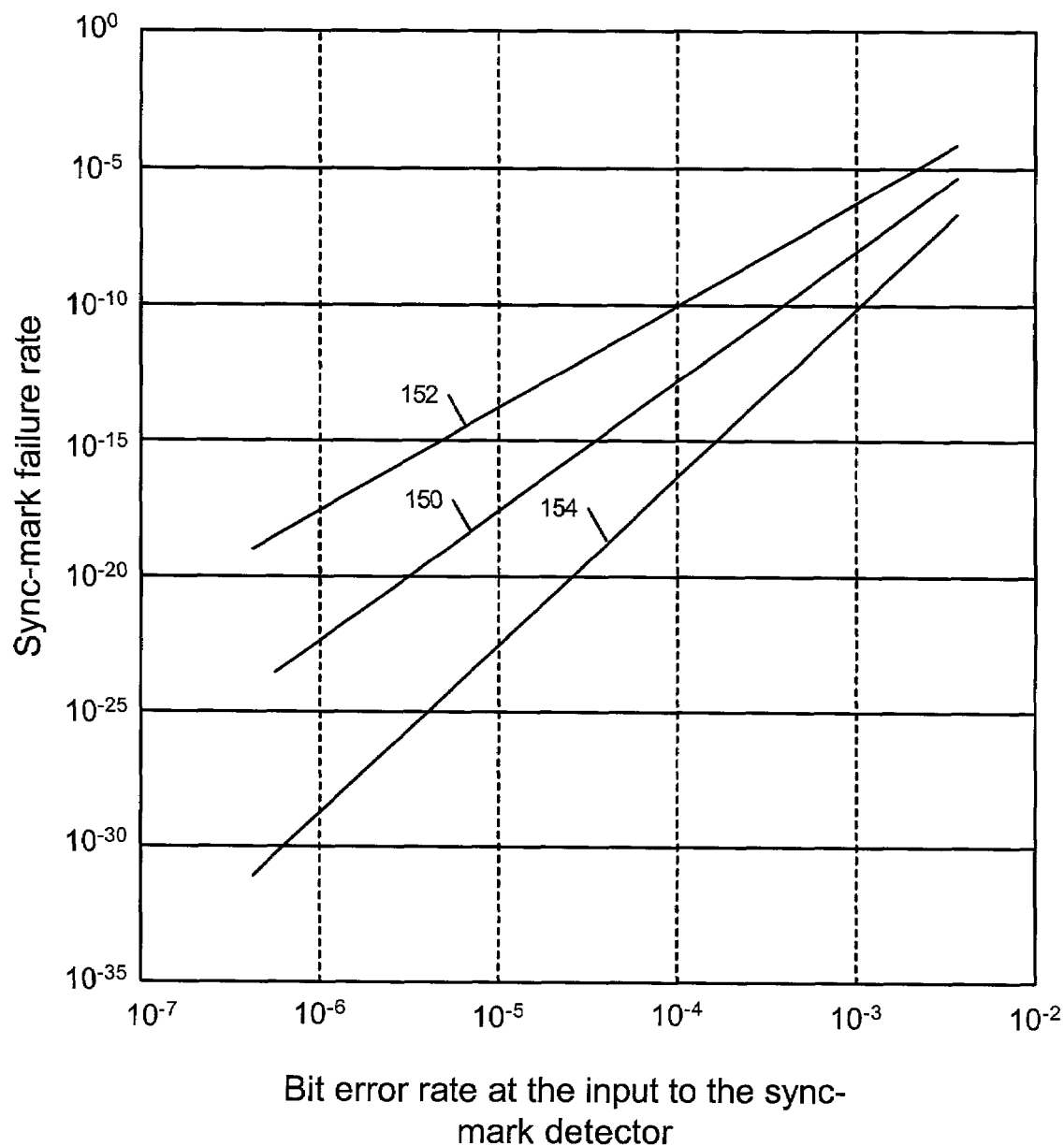
FIG. 9 is a graph illustrating the improved performance of the sync mark detector as compared with a conventional sync mark detector.

Referring now to FIG. 9, the performance of the 36 bit sync mark is shown. At an input bit error rate of $10^{-5}$, the failure rates for the sync mark detector 50 according to the present invention (identified at 150) is three orders of magnitude lower than conventional sync mark detection (identified at 152). If there channel irregularities do not exist (identified at 154), the difference is increased to 8 or more orders of magnitude lower than the conventional sync mark detector.

As can be appreciated from the foregoing, the sync mark detector according to the present invention selects the detection method according to the presence of channel irregularities. When channel irregularities exist, symbol level detection is used where each symbol contains several bits. Otherwise, bit level detection is used. The selected sync marks have large Hamming and symbol distances to guarantee a low early alignment probability when channel irregularities are both present and absent. The sync marks contain carefully designed symbol boundaries to control but not eliminate error propagation.

Conventional sync mark designs attempt to eliminate error propagation by enforcing boundary constraints, which eliminates certain bit patterns at the boundaries and tends to increase the length of sync marks. By allowing the error events to propagate across symbol boundaries and selecting symbol lengths such that the propagation is limited to 2 symbols, the same sync mark failure rates are provided with shorter sync marks. The present invention also provides improved format efficiency in disk drive applications. In particular, if the longest error event causes x bit errors, a symbol length of (x−1) confines the error propagation to 2 symbols.

Using the sync mark criteria set forth above, a sync mark can be readily designed with five-bit or six-bit symbols (or other lengths). In symbol detection mode when channel irregularities exist, a sync mark with (4+3s) symbols can tolerate up to (1+s) error events by using a (2+s)-out-of-(4+3s) matching rule. For example, a 10 symbol sync mark with a 4 out of 10 matching rule can tolerate up to 3 error events.

As can be appreciated by skilled artisans, the sync mark detector according to the present invention may be implemented in a variety of ways. For example, the sync mark detector can be implemented using discrete components, application specific integrated circuits (ASICs), a processor with memory and software, or in any other suitable manner.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A sync mark detector for identifying a sync mark in an incoming bitstream of a communications channel, comprising:
   a bit comparing circuit that compares said sync mark bit-by-bit to said incoming bitstream in a first coding domain if channel irregularities do not exist; and
   a symbol comparing circuit that compares said sync mark symbol-by-symbol to said incoming bitstream in a second coding domain that is different than said first coding domain if said channel irregularities do exist.

2. The sync mark detector of claim 1 further comprising a front end that communicates with said bit and symbol comparing circuits, that outputs said incoming bitstream and that generates a channel irregularity signal when said channel irregularities exist.

3. The sync mark detector of claim 1 further comprising a bit decision circuit that decodes said incoming bitstream.

4. The sync mark detector of claim 3 further comprising a first buffer that communicates with said bit decision circuit and that stores M bits of said incoming bitstream at a desired phase.

5. The sync mark detector of claim 3 further comprising a first post coding circuit that communicates with said bit decision circuit.

6. The sync mark detector of claim 5 further comprising a first buffer that communicates with said first post coding circuit and that stores M bits of said incoming bitstream at a desired phase.

7. The sync mark detector of claim 6 wherein said first post coding circuit performs INRZI post coding.

8. The sync mark detector of claim 6 wherein said first post coding circuit performs NRZI post coding.

9. The sync mark detector of claim 3 further comprising a second buffer that communicates with said bit decision circuit and that stores M bits of said incoming bitstream at a desired phase.

10. The sync mark detector of claim 3 further comprising a second post coding circuit that communicates with said bit decision circuit.

11. The sync mark detector of claim 10 further comprising a second buffer that communicates with said second post coding circuit and that stores M bits of said incoming bitstream at a desired phase.

12. The sync mark detector of claim 10 wherein said second post coding circuit performs INRZI post coding.

13. The sync mark detector of claim 10 wherein said second post coding circuit performs NRZI post coding.

14. The sync mark detector of claim 1 wherein said bit comparing circuit implements a bit level matching rule.

15. The sync mark detector of claim 1 wherein said symbol comparing circuit implements a symbol level matching rule.

16. The sync mark detector of claim 14 wherein bit comparing circuit generates a sync mark found state when said bit level matching rule is satisfied.

17. The sync mark detector of claim 15 wherein symbol comparing circuit generates a sync mark found state when said symbol level matching rule is satisfied.

18. The sync mark detector of claim 1 wherein said sync mark in said incoming bitstream has large Hamming and symbol distances to provide low early alignment and low sync mark miss probabilities.

19. A sync mark detector for identifying a sync mark in an incoming bitstream of a communications channel, comprising:
   a bit comparing circuit that compares said sync mark bit-by-bit to said incoming bitstream if channel irregularities do not exist; and
   a symbol comparing circuit that compares said sync mark symbol-by-symbol to said incoming bitstream if said channel irregularities do exist, wherein a longest error event in said sync mark causes x bit errors and wherein a symbol length of said symbols in said incoming bitstream are limited to x−1, where x is an integer.

20. The sync mark detector of claim 1 wherein each symbol includes a plurality of bits.

21. A sync mark detector for identifying a sync mark in an incoming bitstream of a communications channel, comprising:
   a bit comparing circuit that compares said sync mark bit-by-bit to said incoming bitstream if channel irregularities do not exist; and
   a symbol comparing circuit that compares said sync mark symbol-by-symbol to said incoming bitstream if said channel irregularities do exist, wherein said sync mark includes (4+3s) symbols and said symbol comparing circuit implements a (2+s) out of (4+3s) symbol matching rule for identifying sync marks, wherein s is an integer.

22. The sync mark detector of claim 1 wherein said communications channel is a disk drive.

23. A sync mark detector for identifying a sync mark in an incoming bitstream of a communications channel, comprising:
   a bit comparing circuit that compares said sync mark bit-by-bit to said incoming bitstream if channel irregularities do not exist; and a symbol comparing circuit that compares said sync mark symbol-by-symbol to said incoming bitstream if said channel irregularities do exist, wherein said sync mark does not contain "101" or "010" bits and does not contain "10001" or "01110" patterns starting immediately before a symbol boundary.

24. A sync mark detector for identifying a sync mark in an incoming bitstream of a communications channel, comprising:
   a bit comparing circuit that compares said sync mark bit-by-bit to said incoming bitstream if channel irregularities do not exist; and
   a symbol comparing circuit that compares said sync mark symbol-by-symbol to said incoming bitstream if said channel irregularities do exist, wherein said bit comparing circuit implements a bit level matching rule and wherein said bit level matching rule is met if bit differences are less than half of the Hamming distance $d_H$.

25. The sync mark detector of claim 14 wherein said bit level matching rule is met if bit differences are greater than or equal to $M-[(d_H-1)/2]$ wherein M is a number of bits in said sync mark.

26. The sync mark detector of claim 1 wherein said channel irregularities produce long consecutive bit errors and wherein said channel irregularities are caused by at least one of thermal asperity and media defects.

27. The sync mark detector of claim 1 wherein said sync mark detector is implemented in software and is executed by a processor and memory.

28. The sync mark detector of claim 17 wherein said symbol matching rule allows an error event to produce more than one symbol error.

29. A sync mark detector for identifying a sync mark in an incoming bitstream of a communications channel, comprising:
   bit comparing means for comparing said sync mark bit-by-bit to said incoming bitstream in a first coding domain if channel irregularities do not exist; and
   symbol comparing means for comparing said sync mark symbol-by-symbol to said incoming bitstream in a second coding domain that is different than said first coding domain if said channel irregularities do exist.

30. The sync mark detector of claim 29 further comprising front end means for communicating with said bit and symbol comparing means, for providing said incoming bitstream and for generating a channel irregularity signal when said channel irregularities exist.

31. The sync mark detector of claim 29 further comprising bit decision means for decoding said incoming bitstream.

32. The sync mark detector of claim 31 further comprising first buffer means for communicating with said bit decision means and for storing M bits of said incoming bitstream at a desired phase.

33. The sync mark detector of claim 31 further comprising a first post coding means for coding said incoming bitstream.

34. The sync mark detector of claim 33 further comprising first buffer means for communicating with said first post coding means and for storing M bits of said incoming bitstream at a desired phase.

35. The sync mark detector of claim 34 wherein said first post coding means performs INRZI post coding.

36. The sync mark detector of claim 34 wherein said first post coding means performs NRZI post coding.

37. The sync mark detector of claim 31 further comprising second buffer means for communicating with said bit decision means and for storing M bits of said incoming bitstream at a desired phase.

38. The sync mark detector of claim 31 further comprising second post coding means for communicating with said bit decision means.

39. The sync mark detector of claim 38 further comprising second buffer means for communicating with said second post coding means and for storing M bits of said incoming bitstream at a desired phase.

40. The sync mark detector of claim 38 wherein said second post coding means performs INRZI post coding.

41. The sync mark detector of claim 38 wherein said second post coding means performs NRZI post coding.

42. The sync mark detector of claim 29 wherein said bit comparing means implements a bit level matching rule.

43. The sync mark detector of claim 29 wherein said symbol comparing means implements a symbol level matching rule.

44. The sync mark detector of claim 42 wherein bit comparing means generates a sync mark found state when said bit level matching rule is satisfied.

45. The sync mark detector of claim 43 wherein symbol comparing means generates a sync mark found state when said symbol level matching rule is satisfied.

46. The sync mark detector of claim 29 wherein said sync mark in said incoming bitstream has large Hamming and symbol distances to provide low early alignment and low sync mark miss probabilities.

47. A sync mark detector for identifying a sync mark in an incoming bitstream of a communications channel, comprising:
   bit comparing means for comparing said sync mark bit-by-bit to said incoming bitstream if channel irregularities do not exist; and
   symbol comparing means for comparing said sync mark symbol-by-symbol to said incoming bitstream if said channel irregularities do exist, wherein a longest error event in said sync mark causes x bit errors and wherein a symbol length of said symbols in said incoming bitstream are limited to x−1, where x is an integer.

48. The sync mark detector of claim 29 wherein each symbol includes a plurality of bits.

49. A sync mark detector for identifying a sync mark in an incoming bitstream of a communications channel, comprising:
   bit comparing means for comparing said sync mark bit-by-bit to said incoming bitstream if channel irregularities do not exist; and
   symbol comparing means for comparing said sync mark symbol-by-symbol to said incoming bitstream if said channel irregularities do exist, wherein said sync mark includes (4+3s) symbols and said symbol comparing means implements a (2+s) out of (4+3s) symbol matching rule for identifying sync marks, wherein s is an integer.

50. The sync mark detector of claim 29 wherein said communications channel is a disk drive.

51. A sync mark detector for identifying a sync mark in an incoming bitstream of a communications channel, comprising:
   bit comparing means for comparing said sync mark bit-by-bit to said incoming bitstream if channel irregularities do not exist; and
   symbol comparing means for comparing said sync mark symbol-by-symbol to said incoming bitstream if said channel irregularities do exist, wherein said sync mark does not contain "101" or "010" bits.

52. A sync mark detector for identifying a sync mark in an incoming bitstream of a communications channel, comprising:
bit comparing means for comparing said sync mark bit-by-bit to said incoming bitstream if channel irregularities do not exist; and
symbol comparing means for comparing said sync mark symbol-by-symbol to said incoming bitstream if said channel irregularities do exist, wherein said sync mark does not contain "10001" or "01110" patterns starting immediately before a symbol boundary.

53. A sync mark detector for identifying a sync mark in an incoming bitstream of a communications channel, comprising:
bit comparing means for comparing said sync mark bit-by-bit to said incoming bitstream if channel irregularities do not exist; and
symbol comparing means for comparing said sync mark symbol-by-symbol to said incoming bitstream if said channel irregularities do exist, wherein said bit comparing means implements a bit level matching rule and wherein said bit level matching rule is met if bit differences are less than half of the Hamming distance $d_H$.

54. The sync mark detector of claim 42 wherein said bit level matching rule is met if bit differences are greater than or equal to $M-[(d_H-1)/2]$ wherein M is a number of bits in said sync mark.

55. The sync mark detector of claim 29 wherein said channel irregularities cause long consecutive bit errors.

56. The sync mark detector of claim 29 wherein said channel irregularities are caused by at least one of thermal asperity and media defects.

57. The sync mark detector of claim 29 wherein said sync mark detector is implemented in software and is executed by a processor and memory.

58. A method for identifying a sync mark in an incoming bitstream of a communications channel, comprising:
comparing said sync mark bit-by-bit to said incoming bitstream in a first coding domain if channel irregularities do not exist; and
comparing said sync mark symbol-by-symbol to said incoming bitstream in a second coding domain that is different than said first coding domain if said channel irregularities do exist.

59. The method of claim 58 further comprising generating a channel irregularity signal when said channel irregularities exist.

60. The method of claim 58 further comprising decoding said incoming bitstream.

61. The method of claim 60 further comprising storing M bits of said incoming bitstream at a desired phase.

62. The method of claim 60 further comprising post coding said incoming bitstream using a first post coding method.

63. The method of claim 62 further comprising storing M bits of said incoming bitstream at a desired phase.

64. The method of claim 62 wherein said first post coding method is INRZI post coding.

65. The method of claim 62 wherein said first post coding method is NRZI post coding.

66. The method of claim 60 further comprising storing M bits of said incoming bitstream at a desired phase.

67. The method of claim 60 further comprising post coding said incoming bitstream using a second post coding method.

68. The method of claim 67 further comprising storing M bits of said incoming bitstream at a desired phase.

69. The method of claim 67 wherein said second post coding method is INRZI post coding.

70. The method of claim 67 wherein said second post coding method is NRZI post coding.

71. The method of claim 58 further comprising implementing a bit level matching rule.

72. The method of claim 58 further comprising implementing a symbol level matching rule.

73. The method of claim 71 further comprising generating a sync mark found state when said bit level matching rule is satisfied.

74. The method of claim 72 further comprising generating a sync mark found state when said symbol level matching rule is satisfied.

75. The method of claim 58 wherein said sync mark in said incoming bitstream has large Hamming and symbol distances to provide low early alignment and low sync mark miss probabilities.

76. A method for identifying a sync mark in an incoming bitstream of a communications channel, comprising:
comparing said sync mark bit-by-bit to said incoming bitstream if channel irregularities do not exist; and
comparing said sync mark symbol-by-symbol to said incoming bitstream if said channel irregularities do exist wherein a longest error event in said sync mark causes x bit errors and wherein a symbol length of said symbols in said incoming bitstream are limited to x−1.

77. The method of claim 58 wherein each symbol includes a plurality of bits.

78. A method for identifying a sync mark in an incoming bitstream of a communications channel, comprising:
comparing said sync mark bit-by-bit to said incoming bitstream if channel irregularities do not exist; and
comparing said sync mark symbol-by-symbol to said incoming bitstream if said channel irregularities do exist wherein said sync mark includes (4+3s) symbols and said symbol matching rule is a (2+s) out of (4+3s) for identifying sync marks, wherein s is an integer.

79. The method of claim 58 wherein said communications channel is a disk drive.

80. A method for identifying a sync mark in an incoming bitstream of a communications channel, comprising:
comparing said sync mark bit-by-bit to said incoming bitstream if channel irregularities do not exist; and
comparing said sync mark symbol-by-symbol to said incoming bitstream if said channel irregularities do exist wherein said sync mark does not contain "101" or "010" bits.

81. A method for identifying a sync mark in an incoming bitstream of a communications channel, comprising:
comparing said sync mark bit-by-bit to said incoming bitstream if channel irregularities do not exist; and
comparing said sync mark symbol-by-symbol to said incoming bitstream if said channel irregularities do exist wherein said sync mark does not contain "10001" or "01110" patterns starting immediately before a symbol boundary.

82. A method for identifying a sync mark in an incoming bitstream of a communications channel, comprising:
comparing said sync mark bit-by-bit to said incoming bitstream if channel irregularities do not exist;

comparing said sync mark symbol-by-symbol to said incoming bitstream if said channel irregularities do exist; and implementing a symbol level matching rule wherein said bit level matching rule is met if bit differences are less than half of the Hamming distance $d_H$.

83. The method of claim 71 wherein said bit level matching rule is met if bit differences are greater than or equal to M−[($d_H$−1)/2] wherein M is a number of bits in said sync mark.

84. The method of claim 58 wherein said channel irregularities cause long consecutive bit errors.

85. The method of claim 58 wherein said channel irregularities are caused by at least one of thermal asperity and media defects.

86. The method of claim 29 wherein said method is implemented in software and is executed by a processor and memory.

* * * * *